United States Patent [19]

Hashimoto et al.

[11] Patent Number: 5,045,582
[45] Date of Patent: Sep. 3, 1991

[54] FIRE-RETARDANT POLYCARBONATE RESIN COMPOSITION

[75] Inventors: Kouji Hashimoto; Noboru Yamanishi, both of Matsuyama, Japan

[73] Assignee: Teijin Chemicals, Ltd., Tokyo, Japan

[21] Appl. No.: 498,735

[22] Filed: Mar. 26, 1990

[30] Foreign Application Priority Data

Mar. 27, 1989 [JP] Japan ................................ 64-71998

[51] Int. Cl.$^5$ .......................... C08K 3/30; C08K 3/28; C08K 5/521
[52] U.S. Cl. .................................. 524/156; 524/165; 524/410; 524/411; 524/412; 125/462
[58] Field of Search .............. 524/165, 156, 410, 411, 524/412; 525/394, 462

[56] References Cited

U.S. PATENT DOCUMENTS 3,912,792 10/1975 Touval ................................ 524/142
4,222,910 9/1980 Tokuda ............................... 525/394
4,391,935 7/1983 Bialons et al. ..................... 524/165

FOREIGN PATENT DOCUMENTS 702625 1/1965 Canada .
186 1/1979 European Pat. Off. .

Primary Examiner—Veronica P. Hoke
Attorney, Agent, or Firm—Sherman and Shalloway

[57] ABSTRACT

A fire-retardant polycarbonate resin composition comprising 100 parts by weight of a halogen atom-free conventional polycarbonate resin having a viscosity-average molecular weight of 10,000 to 30,000, a fire retardant in an amount necessary for imparting fire retardance, and 5 to 60 parts by weight of a halogen atom-free ultrahigh-molecular-weight polycarbonate resin having a viscosity-average molecular weight of 100,000 to 250,000, said composition showing a flow value of 0.01 to 0.3 cm$^3$/sec when measured at 280° C. under a load of 180 kg/cm$^2$ using a die having a hold diameter of 1 mm and a length of 10 mm and performance rated at class V-0 when conducting a burning test in accordance with a UL-94 test about a test piece having a thickness of 1 mm.

4 Claims, No Drawings

FIRE-RETARDANT POLYCARBONATE RESIN COMPOSITION

This invention relates to a highly fire-retardant polycarbonate resin composition containing a fire retardant.

Polycarbonate resins are utilized in many fields owing to their excellent electrical and mechanical properties. The polycarbonate resins have self-extinguishing properties but are required to be more fire-retardant depending on usages.

As a method for imparting fire retardance to a polycarbonate resin, there has been so far known a method in which a polycarbonate resin is blended with an organic halogen compound or an organic sulfonic acid salt. To be concrete, known examples of such method are a method in which a polycarbonate resin is blended with a polycarbonate from 2,2-bis(4-hydroxy-3,5-dibromophenyl)propane terminated by a halogenated phenol (Japanese Patent Publication No. 41422/1973), and a method in which a polycarbonate resin (especially, a branched polycarbonate resin) is rendered flame-retardant with sulfonic acid salts, etc. and perfluoroalkanesulfonic acid aryl esters are blended as a drop-proofing agent (U.S. Pat. No. 4,774,273).

However, with the technical advancement in recent years, the products have become light-weight and small-sized, and regarding fire retardance, higher performance has come to be required of resins; fire retardance provided by the above methods, i.e. fire retardance rated at class V-0 in a UL-94 test about a 1.6 mm thick test piece is now insufficient. For example, fire retardance rated at class V-0 about a test piece having a thickness of 1 mm is required. A big problem encountered in the fire-retardant polycarbonate resins is a dropping phenomenon in burning thin molded articles. As the thin molded articles are easy to drop in burning, they can hardly be rated at class V-0 in the UL-94 test.

It is an object of this invention to provide a polycarbonate resin composition having such high fire retardance that the dropping phenomenon does not occur in burning a thin molded article.

The present inventors have made extensive studies to achieve the aforesaid object, and consequently found that a thin molded article made of a composition comprising a conventional polycarbonate resin, a fire retardant and a specific ultrahigh-molecular-weight polycarbonate resin does not allow a dropping phenomenon in burning and has high fire retardance.

This invention thus provides a fire-retardant polycarbonate resin composition comprising 100 parts by weight of a halogen atom-free conventional polycarbonate resin having a viscosity-average molecular weight of 10,000 to 30,000, a fire retardant in an amount necessary for imparting fire retardance, and 5 to 60 parts by weight of a halogen atom-free ultrahigh-molecular-weight polycarbonate resin having a viscosity-average molecular weight of 100,000 to 250,000, said composition showing a flow value of 0.01 to 0.3 cm3/sec when measured at 280° C. under a load of 180 kg/cm² using a die having a hole diameter of 1 mm and a length of 10 mm and performance rated at class V-0 when conducting a burning test in accordance with a UL-94 test about a test piece having a thickness of 1 mm.

The viscosity-average molecular weight ($\overline{M}$) here referred to is found by inserting in the following equation a specific viscosity $\eta sp$ measured at 20° C. for a solution of a polycarbonate resin in methylene chloride in a concentration of 0.7 g/dl.

$$\eta sp/C = [\eta] + 0.45 \times [\eta]^2 C.$$

$$[\eta] = 1.23 \times 10^{-4} (\overline{M})^{0.83}$$

wherein $C = 0.7$.

By the way, regarding the joint use of two types of polycarbonate resins, U.S. Pat. No. 4,186,154 discloses a composition comprising 15 to 50 % by weight of a halogen atom-free aromatic polycarbonate having a weight-average molecular weight of 70,000 to 120,000 and 85 to 50 % by weight of a halogen atom-free aromatic polycarbonate having a weight-average molecular weight of 29,000 to 39,000. However, since the weight-average molecular weights of 70,000 to 120,000 and 29,000 to 39,000, when converted into what this invention terms the viscosity-average molecular weights, correspond to about 50,700 to 82,000 and about 23,000 to 30,000 respectively, the composition disclosed in said U.S. Pat. No. 4,186,154 sharply differs in components from the composition of this invention. Said U.S. Pat. No. 4,186,154 moreover discloses only the improvement in stretch crack resistance of the molded article made of said composition and does not refer to the improvement in fire retardance of the molded article.

The conventional polycarbonate resin (hereinafter called a "polycarbonate resin A") in this invention is a halogen atom-free polycarbonate resin formed by a solvent method in which a dihydric phenol and phosgene are reacted in an inert solvent in the presence of an end capping agent and an acid acceptor or a melting method in which a dihydric phenol and diphenyl carbonate are reacted in a molten state, said resin having a viscosity-average molecular weight of 10,000 to 30,000, preferably 10,000 to 28,000 and being subjected to usual melt-molding.

The dihydric phenol used here is preferably a bisphenol. Especially, 2,2-bis(4-hydroxyphenyl)propane (generally called "bisphenol A") is preferable. A part or the whole of bisphenol A may be substituted by another diphenol. Examples of another diphenol are 4,4'-dihydroxydiphenyl, hydroquinone, 1,1-bis(4-hydroxyphenyl)-ethane, 1,1bis(4-hydroxyphenyl)-1-phenylethane, 1,1-bis-(4-hydroxyphenyl) cyclohexane, 2,2-bis(4-hydroxy-3,5-dimethylphenyl)propane, bis(hydroxyphenyl)ethers, bis-(hydroxyphenyl)sulfones, bis(hydroxyphenyl)sulfides and bis(hydroxyphenyl)sulfoxides.

The fire retardant used in this invention may be any fire retardant available in the polycarbonate resin. At least one of halo-substituted aliphatic or aromatic compounds, organic or inorganic acid alkali metal or alkaline earth metal salts, sulfonic acid alkali metal or alkaline earth metal salts, sulfuric acid esters and sulfuric acid alkali metal or alkaline earth metal salts is usable. Concrete examples of the halo-substituted aliphatic compounds are chlorinated parafins and tetrabromobutane. Concrete examples of the halo-substituted aromatic compounds are brominated biphenyl, brominated biphenyl ether, tris(2,4,6-tribromophenyl)phosphate, 2,2-bis(4-hydroxy-3,5-dibromophenyl)propane and poly[oxycarbonyloxy(2,6-dibromo-1,4-phenylene)(1-methyl-ethylidene) (3,5-dibromo-1,4-phenylene)](provided an average degree of polymerization is 2 or more).

Concrete examples of the organic or inorganic acid alkali metal or alkaline earth metal salts are disodium hexafluoroglutarate, calcium 2,3,4,5,6-penta-chlorocinnamate, potassium imidobis(diphenyl phosphate), potassium bis(4-bromophenyl)phosphate, sodium chloride, sodium bromide, calcium fluoride and sodium fluoride.

Concrete examples of the sulfonic acid alkali metal or alkaline earth metal salts are sodium 3,4-di-chlorobenzenesulfonate, sodium 2,4,5-trichlorobenzenesulfonate, potassium 2,5-dichlorobenzenesulfonate and potassium perfluorobutanesulfonate.

Concrete examples of the sulfuric acid esters and sulfuric acid alkali metal or alkaline earth metal salts are sodium lauryl sulfate, sodium hexadecyl sulfate, potassium stearyl sulfate, sodium sulfate and potassium sulfate.

Of these, poly[oxycarbonyloxy(2,6-dibromo-1,4-phenylene) (1-methylethylidene)(3,5-dibromo-1,4-phenylene) ] and alkali metal salts soluble in polycarbonate resins are preferable in that they provide excellent transparency.

The amount of such fire retardant is not specified in particular because it varies with the type of the fire retardant. However, it may be an amount commonly employed to impart fire retardance to the polycarbonate resins. For example, in case of the poly[oxycarbonyloxy (2,6-dibromo-1,4-phenylene)(1-methylethylidene)(3,5-di-bromo-1,4-phenylene)], it is 5 to 20 % by weight and in case of tris(2,4,6-tribromophenyl)-phosphate, it is 3 to 15 % by weight.

The aforesaid ultrahigh-molecular-weight polycarbonate resin (hereinafter called a "polycarbonate resin B") is a halogen atom-free ultrahigh-molecular-weight polycarbonate resin having a viscosity-average molecular weight of 100,000 to 250,000 and incapable of melt-molding. The constituents thereof may be the same as, or different from, the above-described constituents of the polycarbonate resin A; the same constituents are preferable though.

If a polycarbonate resin having a viscosity-average molecular weight of less than 100,000 is used as the polycarbonate resin B, it has to be used in a large amount for preventing drop in burning, with a result that a melt viscosity increases (a flow value decreases) and melt-molding, especially injection-molding becomes difficult. If the amount of the polycarbonate resin B is rendered small for maintaining a suitable melt viscosity, it is impossible to prevent drop in burning. Moreover, when using a polycarbonate resin having a viscosity-average molecular weight of more than 250,000, drop in burning is preventable, but a melt viscosity increases, making difficult the melt-molding.

When an amount of the polycarbonate resin B is too small, drop in burning cannot be prevented enough. Meanwhile, when it is too large, a melt viscosity increases, and the object of this invention cannot be achieved. The optimum amount can properly be selected from the range of 5 to 60 parts by weight per 100 parts by weight of the polycarbonate resin A.

The composition of this invention is produced by an optional method, e.g. a method in which a powdery polycarbonate resin A, a powdery polycarbonate resin B and a fire retardant are mixed in given amounts either simultaneously or in any order and a method in which to a solution of the polycarbonate A or B the remaining components are added in solution or powdery form either simultaneously or in any order.

The composition of this invention can be blended with other additives, if required, such as an antistatic agent, a mold release agent, a pigment, a heat stabilizer, an ultraviolet stabilizer, etc. so far as they do not deviate from the object of this invention. Besides, unless transparency is required, an inorganic filler, a fibrous reinforcing material, etc. can be blended.

The composition of this invention has excellent moldability and can give varied useful molded articles by varied moldings such as injection molding, extrusion molding, rotational molding, compression molding and calender molding.

The molded article made of the composition of this invention shows excellent fire retardance even if it is thin, and has transparency which is an excellent property of the polycarbonate resin, its industrial value being very great.

The following non-limitative Examples illustrate this invention specifically.

PREPARATION EXAMPLE (1) Preparation of a polycarbonate resin A

When bisphenol A, p-tert-butylphenol as an end capping agent and phosgene were reacted in the presence of methylene chloride, a 10% sodium hydroxide aqueous solution and triethylamine in a usual manner to prepare a polycarbonate resin, the p-tert-butylphenol was used in amounts of 0.075, 0.063, 0.058, 0.030 and 0.020 moles per mole of bisphenol A to prepare polycarbonate resins A having viscosity-average molecular weights of 11,700, 14,500, 15,500, 23,700 and 28,900 respectively.

(2) Preparation of a polycarbonate resin B

The above preparation of the polycarbonate resin A was repeated except that the amounts of the p-tert-butylphenol as the end capping agent were changed into 0.005, 0.004, 0.002 and 0.0005 moles per mole of the bisphenol A to prepare polycarbonate resins B having viscosity-average molecular weights of 105,000, 121,000, 170,000 and 233,000 respectively.

EXAMPLES 1 to 9 and COMPARATIVE EXAMPLES 1 to 5

One hundred parts by weight of a polycarbonate resin A having a viscosity-average molecular weight ($\overline{M}$) shown in Table 1, a polycarbonate resin B in an amount shown in Table 1, having a viscosity-average molecular weight ($\overline{M}$) shown in Table 1, 10.5 % by weight, based on the total amount of the resins, of a poly[oxycarbonyloxy-(2,6-dibromo-1,4-phenylene)(1-methylethylidene) (3,5-dibromo-1,4-phenylene)] having a specific viscosity of 0.045 (measured at 20° C. in a methylene chloride solution in a concentration of 0.7 g/dl), and 0.01 % by weight, based on the total amount of the resins, of sodium lauryl sulfate were mixed. While keeping a feed rate of 5 kg/hr by a table feeder, the mixture was extruded at 320° C. through a biaxial extruder to produce pellets.

A flow value (Q value: cm$^3$/sec) was measured for the resulting pellets at a temperature of 280° C. under a load of 180 kg/cm$^2$ using a die (Koka-type flow tester manufactured by Shimazu Seisakusho) having a hole diameter of 1 mm and a length of 10 mm. The results are shown in Table 1.

Five test pieces of 127 × 12.7 × 1.0 mm were prepared at a molding temperature of 300° C. by means of a 3 oz injection molding machine, and fire retardance was evaluated for said test pieces in accordance with a UL-94 test. The results are shown in Table 1.

TABLE 1

| | | Polycarbonate resin A | | Polycarbonate resin B | | Results | | |
|---|---|---|---|---|---|---|---|---|
| | | $\overline{M}$ | parts of weight | $\overline{M}$ | parts of weight | Q value | Appearance | Number of drops | Fire retardance |
| Example | 1 | 11,700 | 100 | 233,000 | 25 | 0.13 | transparent | 0 | V-0 |
| | 2 | 11,700 | 100 | 105,000 | 55 | 0.08 | transparent | 0 | V-0 |
| | 3 | 14,500 | 100 | 170,000 | 10 | 0.18 | transparent | 0 | V-0 |
| | 4 | 14,500 | 100 | 121,000 | 15 | 0.19 | transparent | 0 | V-0 |
| | 5 | 15,500 | 100 | 121,000 | 45 | 0.06 | transparent | 0 | V-0 |
| | 6 | 15,500 | 100 | 105,000 | 7 | 0.22 | transparent | 0 | V-0 |
| | 7 | 23,700 | 100 | 121,000 | 20 | 0.03 | transparent | 0 | V-0 |
| | 8 | 23,700 | 100 | 105,000 | 20 | 0.04 | transparent | 0 | V-0 |
| | 9 | 28,900 | 100 | 105,000 | 10 | 0.02 | transparent | 0 | V-0 |
| Comparative Example | 1 | 11,700 | 100 | — | 0 | 2.25 | transparent | 7 | V-2 |
| | 2 | 14,500 | 100 | — | 0 | 0.48 | transparent | 5 | V-2 |
| | 3 | 15,500 | 100 | — | 0 | 0.42 | transparent | 5 | V-2 |
| | 4 | 23,700 | 100 | — | 0 | 0.06 | transparent | 3 | V-2 |
| | 5 | 28,900 | 100 | — | 0 | 0.02 | transparent | 2 | V-2 |

EXAMPLES 10 to 15

In the same way as in EXAMPLE 1, pellets were produced and the Q value was measured except mixing 100 parts by weight of a polycarbonate resin A having a viscosity-average molecular weight ($\overline{M}$) of 23,700, 20 parts by weight of a polycarbonate resin B having a viscosity-average molecular weight ($\overline{M}$) of 121,000 and a fire retardant shown in Table 2 in an amount shown in Table 2. In the same way as in EXAMPLE 1, test pieces were prepared and fire retardance was evaluated. The results are shown in Table 2.

Symbols showing types of the fire retardants in Table 2 indicate the following compounds.

TABLE 2

A: poly[oxycarbonyloxy(2,6-dibromo-1,4-phenylene)(1-methylethylidene)(3,5-dibromo-1,4-phenylene)]having a specific viscosity of 0.045 (measured at 20° C. in a methylene chloride solution in a concentration of 0.7 g/dl)

B: 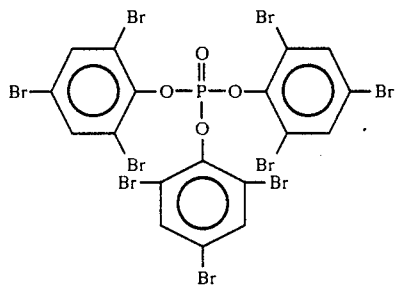

C: 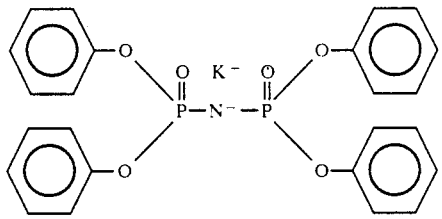

D: 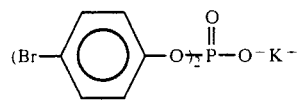

E: sodium lauryl sulfate

| | Fire retardant | | Results | | | |
|---|---|---|---|---|---|---|
| Example | type | parts of weight | Q value | Appearance | Number of drops | Fire retardance |
| 10 | A | 13 | 0.03 | transparent | 0 | V-0 |
| 11 | B | 9 | 0.03 | transparent | 0 | V-0 |
| 12 | A C | 11 0.05 | 0.03 | transparent | 0 | V-0 |
| 13 | A B | 7 4 | 0.03 | transparent | 0 | V-0 |
| 14 | B D | 8 0.03 | 0.03 | transparent | 0 | V-0 |
| 15 | B E | 8 0.01 | 0.03 | transparent | 0 | V-0 |

EXAMPLES 16 to 18

In the same way as in EXAMPLE 1, pellets were produced and the Q value was measured except mixing 100 parts by weight of a polycarbonate resin A having a viscosity-averaged molecular weight (e,ovs/M/ ) of 14,500, 15 parts by weight of a polycarbonate resin B having a viscosity-average molecular weight ($\overline{M}$) of 121,000 and a fire retardant shown in Table 3 in an amount shown in Table 3. In the same way as in EXAMPLE 1, test pieces were prepared and fire retardance was evaluated. The results are shown in Table 3.

Symbols showing types of the fire retardants in Table 3 are the same as above.

TABLE 3

|         |    | Fire retardant | | Results | | | |
|---------|----|------|------------------|---------|------------|-----------------|----------------|
|         |    | type | parts of weight  | Q value | Appearance | Number of drops | Fire retardance |
| Example | 16 | A    | 11               | 0.19    | transparent | 0 | V-0 |
|         |    | E    | 0.01             |         |            |   |     |
|         | 17 | A    | 5                | 0.19    | transparent | 0 | V-0 |
|         |    | B    | 4.5              |         |            |   |     |
|         |    | D    | 0.01             |         |            |   |     |
|         | 18 | A    | 9                | 0.19    | transparent | 0 | V-0 |
|         |    | E    | 0.03             |         |            |   |     |
|         |    | D    | 0.03             |         |            |   |     |

What we claim is:

1. A fire-retardant polycarbonate resin composition comprising 100 parts by weight of a halogen atom-free conventional polycarbonate resin having a viscosity-average molecular weight of 10,000, to 30,000, a fire retardant in an amount necessary for imparting fire retardance, and 5 to 60 parts by weight of a halogen atom-free ultrahigh-molecular-weight polycarbonate resin having a viscosity-average molecular weight of 100,000 to 250,000, said composition showing a flow value of 0.01 to 0.3 cm$^3$/sec when measured at 280° C. under a load of 180 kg/cm$^2$ using a die having a hole diameter of 1 mm and a length of 10 mm and performance rated at class V-0 when conducting a burning test in accordance with a UL-94 test about a test piece having a thickness of 1 mm.

2. The fire-retardant polycarbonate resin composition of claim 1 wherein the conventional polycarbonate resin has a viscosity-average molecular weight of 10,000 to 28,000, and the ultrahigh-molecular-weight polycarbonate resin has a viscosity-average molecular weight of 100,000 to 250,000.

3. The fire-retardant polycarbonate resin composition of claim 1 wherein the conventional polycarbonate resin and the ultrahigh-molecular-weight polycarbonate resin comprise the same constituents.

4. The fire-retardant polycarbonate resin composition of claim 3 wherein the conventional polycarbonate resin and the ultrahigh-molecular-weight polycarbonate resin are derived from bisphenol A.

* * * * *